(12) United States Patent
Tsunekawa et al.

(10) Patent No.: US 7,939,157 B2
(45) Date of Patent: May 10, 2011

(54) HONEYCOMB STRUCTURE AND METHOD FOR MANUFACTURING THE SAME

(75) Inventors: Hajime Tsunekawa, Gifu (JP); Masafumi Kunieda, Gifu (JP)

(73) Assignee: Ibiden Co., Ltd, Gifu (JP)

( * ) Notice: Subject to any disclaimer, the term of this patent is extended or adjusted under 35 U.S.C. 154(b) by 812 days.

(21) Appl. No.: 11/494,645

(22) Filed: Jul. 28, 2006

(65) Prior Publication Data

US 2006/0263574 A1    Nov. 23, 2006

Related U.S. Application Data

(63) Continuation of application No. PCT/JP2005/014865, filed on Aug. 8, 2005.

(30) Foreign Application Priority Data

Oct. 8, 2004   (JP) ................................. 2004-296316

(51) Int. Cl.
   *B32B 3/12*    (2006.01)
   *B01D 39/14*   (2006.01)
   *B01D 39/06*   (2006.01)

(52) U.S. Cl. ............................. 428/116; 55/523; 55/524

(58) Field of Classification Search ........................ None
   See application file for complete search history.

(56) References Cited

U.S. PATENT DOCUMENTS

| | | | |
|---|---|---|---|
| 5,273,692 A | 12/1993 | Numoto et al. | |
| 2006/0172113 A1 | 8/2006 | Kunieda | |
| 2006/0177629 A1 | 8/2006 | Kunieda | |
| 2006/0292044 A1 | 12/2006 | Ohno et al. | |
| 2006/0292330 A1 | 12/2006 | Ohno et al. | |
| 2006/0292331 A1 | 12/2006 | Ohno et al. | |
| 2006/0292332 A1 | 12/2006 | Ohno et al. | |
| 2006/0292333 A1 | 12/2006 | Ohno et al. | |
| 2006/0292334 A1 | 12/2006 | Ohno et al. | |
| 2006/0292335 A1 | 12/2006 | Ohno et al. | |
| 2006/0292336 A1 | 12/2006 | Ohno et al. | |
| 2006/0292337 A1 | 12/2006 | Ohno et al. | |
| 2006/0292338 A1 | 12/2006 | Ohno et al. | |
| 2006/0292339 A1 | 12/2006 | Ohno et al. | |
| 2006/0292340 A1 | 12/2006 | Ohno et al. | |
| 2006/0292341 A1 | 12/2006 | Ohno et al. | |
| 2006/0292342 A1 | 12/2006 | Ohno et al. | |
| 2006/0292393 A1 | 12/2006 | Kunieda | |
| 2007/0004592 A1 | 1/2007 | Ohno et al. | |
| 2007/0004593 A1 | 1/2007 | Ohno et al. | |
| 2007/0077190 A1 | 4/2007 | Ohno et al. | |
| 2008/0118701 A1 | 5/2008 | Ohno et al. | |
| 2008/0119355 A1 | 5/2008 | Ohno et al. | |

(Continued)

FOREIGN PATENT DOCUMENTS

JP           4-068261 B2    10/1992

(Continued)

OTHER PUBLICATIONS

Extended European Search Report, dated Jul. 15, 2008 regarding Application No. 05770549.3-2111/1707545/PCT/JP200501-4865 (5 pgs.).
U.S. Appl. No. 11/925,394.
U.S. Appl. No. 11/853,658.

(Continued)

*Primary Examiner* — Gordon R Baldwin
(74) *Attorney, Agent, or Firm* — Finnegan, Henderson, Farabow, Garrett & Dunner LLP

(57) ABSTRACT

A honeycomb structure of the invention includes ceramic particles and inorganic fibers, and is characterized in that the inorganic fibers satisfy an expression of Aspect Ratio≧Fiber Strength (GPa)/0.3.

7 Claims, 6 Drawing Sheets

U.S. PATENT DOCUMENTS

| | | |
|---|---|---|
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |
| 2009/0095416 A1 | 4/2009 | Kunseda et al. |

FOREIGN PATENT DOCUMENTS

| | | |
|---|---|---|
| JP | 5-213681 | 8/1993 |
| JP | 6-045510 B2 | 6/1994 |
| JP | 2003-290656 | 10/2003 |

OTHER PUBLICATIONS

U.S. Appl. No. 11/928,546.
U.S. Appl. No. 12/238,057.
U.S. Appl. No. 12/245,821.
U.S. Appl. No. 12/246,899.
U.S. Appl. No. 12/246,881.
U.S. Appl. No. 12/239,342.
U.S. Appl. No. 12/246,913.
U.S. Appl. No. 12/246,869.
U.S. Appl. No. 12/248,647.
U.S. Appl. No. 12/248,675.
International Preliminary Report on Patentability (PCT/JP2005/014865).

US 7,939,157 B2

HONEYCOMB STRUCTURE AND METHOD FOR MANUFACTURING THE SAME

CROSS REFERENCE TO THE RELATED APPLICATIONS

The present invention is a continuation of International Application No PCT/JP2005/014865, filed on Aug. 8, 2005 and now abandoned, which claims priority from Japanese Patent Application No. 2004-296316 filed on Oct. 8, 2004.

BACKGROUND ACT

1. Field of the Invention

The present invention relates to a honeycomb structure and a method for manufacturing the same.

2. Description of the Related Art

A honeycomb structure including ceramic particles, inorganic fibers and an inorganic binder has been conventionally known. For example, a method for manufacturing a honeycomb structure disclosed in JP-A 5-213681 prepares a ceramic-contained composition, which is composed by blending ceramic powder such as alumina, silica, etc., inorganic fibers such as ceramic fibers, metallic fibers, etc., and an inorganic binder such as colloidal silica, alumina sol, clay minerals, etc., extrusion-molds the composition, and fire the extrusion-molded body after drying by heating.

SUMMARY OF THE INVENTION

The present invention is directed to a honeycomb structure including ceramic particles and inorganic fibers, where the inorganic fibers satisfy an expression of Aspect Ratio≧Fiber Strength (GPa)/0.3.

In the honeycomb structure of the invention, the content ratio of the inorganic fibers is preferably about 5 to about 30% by weight. The aspect ratio of the inorganic fibers is preferably about 5 or more. In the honeycomb structure of the invention, the inorganic fibers may be ceramic fibers or glass fibers. The honeycomb structure of the invention may be used as a component of an exhaust gas conversion apparatus for a vehicle.

The present invention is further directed to a method for manufacturing a honeycomb structure, including the steps of: blending at least ceramic particles, inorganic fibers and an inorganic binder with each other to obtain a mixed compound; molding the mixed compound into a honeycombed shape to obtain a honeycomb molded body; and firing the honeycomb molded body so as to obtain a honeycomb structure, where the inorganic fibers satisfy an expression of Aspect Ratio≧Fiber Strength (GPa)/0.3.

In the method of the invention, the content ratio of the inorganic fibers is preferably about 5 to about 30% by weight. The aspect ratio of the inorganic fibers is preferably about 5 or more. The inorganic fibers may be ceramic fibers or glass fibers.

BEST MODE FOR CARRYING OUT THE INVENTION

Figure 1:
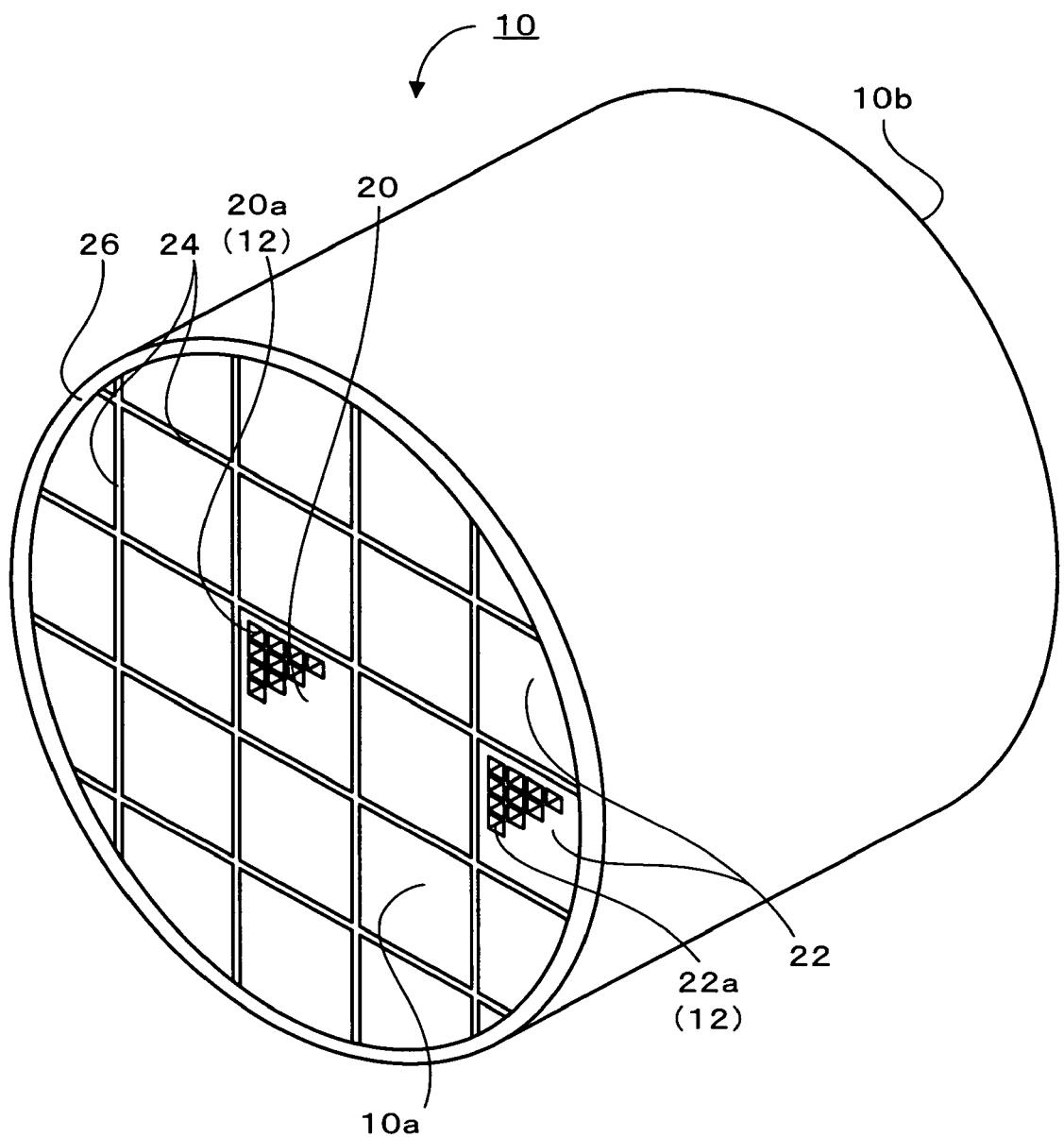
FIG. 1 is a perspective view showing a honeycomb catalyst carrier.

The inventors of the present invention have researched the relationship between an aspect ratio of inorganic fibers, fiber strength, and a bending strength of a honeycomb structure. As a result, it has been found that the bending strength is stabilized at a high level when the aspect ratio and fiber strength are in a certain relationship, and the inventor et al. reached the present invention.

That is, one embodiment of the invention provides a honeycomb structure that includes ceramic particles and inorganic fibers, where the inorganic fibers satisfy an expression of Aspect Ratio is ≧Fiber Strength (GPa)/0.3. The strength of the honeycomb structure shows a remarkably high value when the aspect ratio (=fiber length/fiber diameter) is equal to or more than a value obtained by dividing the fiber strength (GPa) by 0.3 when the point at which the aspect ratio is coincident with the value is regarded as the boundary. That is, when inorganic fibers that satisfy the above-described expression are employed, it is possible to obtain a honeycomb structure having high strength. Also, the fiber strength means the tensile strength of a fibrous material.

Here, the ceramic particles are not specially limited. Examples of the cramic particles include one or two types of particles selected from alumina, silica, zirconia, titania, ceria, mullite, and zeolite. Of these, alumina is preferable. It is preferable that the ceramic particles are provided by about 30 to about 90% by weight in entirety. When the content ratio of ceramic particles is about 30% by weight or more, the amount of ceramic particles that contribute to improvement of the specific surface area is not relatively reduced, and the specific surface area per unit cubic volume of the honeycomb structure does not decrease, where there does not easily arise such an inconvenience by which, for example, a catalyst constituent cannot be highly dispersed. When the content ratio of the ceramic particles is about 90% by weight or less, the amount of inorganic fibers and an inorganic binder, which contribute to improvement of the strength is not relatively reduced, and the strength of the honeycomb structure is adequately maintained. In addition, it is preferable that the mean grain size of the secondary particles of the ceramic particles is about 1 to about 5 μm, and it is preferable that the specific surface area is about 100 m²/g or more.

Also, the inorganic fibers are not specially limited. Examples of the inorganic fibers include ceramic fiber, glass fiber, metallic fiber, carbon fiber, rock fiber, slag fiber, etc. Among these, ceramic fiber and glass fiber are preferable. Herein, the ceramic fiber means a fiber of a non-metallic inorganic material. Examples of the ceramic fibers include carbide-based ceramic fibers such as silicon carbide fibers, boron carbide fibers, etc., nitride-based ceramic fibers such as silicon nitride fibers, boron nitride fibers, etc., and oxide-based ceramic fibers such as zirconia fibers, alumina fibers, silica fibers, silica-alumina fibers, alumina-boroar-silica fibers, potassium titanate fibers, aluminum borate fibers, etc. Examples of the glass fibers include borosilicate glass fibers, soda lime glass fibers, quartz glass fibers, etc. Examples of the metallic fibers include stainless steel fibers, steel fibers, etc. It is preferable that the content ratio of inorganic fibers is about 5 to about 30% by weight in entirety. When the content ratio of the inorganic fibers is about 5% by weight or more in entirety, an effect of reinforcement based on the inorganic fibers can be sufficiently obtained. When the content ratio thereof is about 30% by weight or less in entirety, the content ratio of the inorganic particles is not relatively reduced, and a sufficient specific surface area can be easily obtained as the honeycomb structure. In addition, it is preferable that the aspect ratio of the inorganic fibers is about 5 or more. When the aspect ratio is about 5 or more, regardless of the types of inorganic fibers, an effect of reinforcement based on the inorganic fibers can be adequately obtained.

The inorganic binder contained in the honeycomb structure according to one embodiment of the invention is not specially limited. Examples of the inorganic binder include inorganic sol and clay-based binder, etc. Examples of the inorganic sol include one or two or more types of inorganic sol that is (are) selected from alumina sol, silica sol, titania sol and water glass, etc. Examples of the clay-based binder include one or two or more types of clay-based binder that is (are) selected from china clay, kaolin, montmorillonite, and multiple-chain structure type clay (sepiolite, attapulgite), etc. It is preferable that the amount of an inorganic binder contained in the honeycomb structure is about 50% by weight or less as a solid substance contained in the honeycomb structure. About 5 to about 50% by weight is more preferable, about 10 to about 40% by weight is still more preferable still, and about 15 to about 35% by weight is most preferable. When the content ratio of the inorganic binder is about 50% by weight or less, the moldability is not easily worsened.

A honeycomb structure according to one embodiment of the invention may be utilized as a component of an exhaust gas purifying (or converting) device for a vehicle. For example, it may be used as a catalyst carrier for exhaust gas purification of a vehicle, and may be used as a diesel particulate filter (DPF) for filtrating and purifying particles contained in exhaust gases of a diesel engine. When the honeycomb structure is used as a catalyst carrier, the catalyst constituent to be carried is not particularly limited. The catalyst may be a noble metal, an alkali metal compound, an alkali clay-based metallic component, an oxide, etc. Examples of the noble metal inlcude one or two or more types that is (are) selected from platinum, palladium, rhodium, etc. Examples of the alkali metallic compound include one or two or more types of compounds that is (are) selected from potassium, sodium, etc. Examples of the alkali clay-based metallic compound include a compound such as barium, etc. Examples of the oxide include perovskite ($La_{0.75}K_{0.25}MnO_3$, etc.) and $CeO_2$, etc. Although the honeycomb catalyst obtained is not specially limited, the honeycomb catalyst may be used as, for example, a so-called three-way catalyst and $NO_x$ storage catalyst for conversion of exhaust gases of a vehicle. Also, the carrier of catalyst constituents is not specially limited. However, the catalyst may be carried after a honeycomb structure is manufactured, and may be carried in the stage of ceramic particles of the material. The method for carrying the catalyst constituents is not specially limited. However, the catalyst constituents may be carried by, for example, an impregnation method. In addition, when the honeycomb structure is used as a DPF (Diesel Particulate Filter), a plurality of passages formed as a honeycomb shape are constructed so that passages having one end thereof open and the other end thereof closed and passages having one end thereof closed and the other end thereof open are provided in a mixed state.

Next, a description is given of one example of a method for manufacturing a honeycomb structure according to one embodiment of the invention described above. First, material paste mainly composed of the ceramic particles, inorganic fibers and an inorganic binder is used and is subjected to extrusion molding to prepare a an article (a molded body) with honeycomb structure. An organic binder, a dispersion medium, and molding auxiliaries may be adequately added to the material paste. Examples of the organic binder include one or two or more types of organic binders that is (are) selected from methylcellulose, carboxymethylcelluose, hydroxyethyl-celluose, polyethylene glycol, phenol resin and epoxy resin, etc. It is preferable that the blending ratio of the organic binder is about 1 to about 10% by weight for the entirety of the ceramic particles, inorganic fibers and an inorganic binder. Examples of the dispersion medium include water, organic solvent (benzene, etc.), and alcohol (methanol, etc.). Examples of the molding auxiliaries include ethyleneglycol, dextrin, fatty acid, fatty acid soap, and polyalcohol. Next, the molded body obtained is dried in a drying apparatus. The drying apparatus may be, for example, a microwave drying machine, a hot air drying machine, dielectric drying machine, an evacuation drying machine, a vacuum drying machine, or a freezing drying machine, etc. Also, it is preferable that the molded and dried article is degreased. The degreasing conditions may be adequately selected based on the type and amount of organic substances. For example, the molded body may be dried for about two hours at about 400° C. After that, the molded body is fired. It is preferable that the firing condition is, for example, about 600° C. to about 1000° C. When the firing temperature is about 600° C. or more, sintering of the ceramic particles easily advances, and the strength of the honeycomb structure is adequately increased. To the contrary, when the firing temperature is about 1000° C. or less, the ceramic particles are not excessively sintered, and the specific surface per unit area is not reduced. Through the above-described processes, it is possible to obtain a honeycomb structure.

In the method for manufacturing a honeycomb structure according to one embodiment of the invention, the target honeycomb structure may be obtained through respective processes of drying, degreasing and firing a molded body that is beforehand molded to have the same honeycomb structure as the target shape. Or, the method may include the step of molding a material paste into a plurality of honeycomb article as honeycomb units that are smaller than the target honeycomb structure, performing respective processes of drying, degreasing and firing, and adhering the honeycomb units to each other via sealing layers so that they become a larger shape than the target honeycomb structure. The target honeycomb structure may be obtained by cutting and grinding the honeycomb units adhered to each other. In this case, the material of the sealing layers may be the same material as that of the material paste. Or, after the honeycomb units are adhered to each other via the sealing layers, only the drying may be carried out, where the degreasing and firing may not be carried out, or only the drying and degreasing may be carried out, where the firing may not be carried out. Further, the drying, degreasing and firing may be carried out. Furthermore, the sectional shape of the honeycomb structure according to the invention is not particularly limited, but it may be circular, elliptical or polygonal (for example, triangular to octagonal).

In addition, the respective physical values used in the present specification were obtained as follows. That is, the mean grain sizes were obtained by the laser diffraction scattering method using MALVERN master sizer micro. Also, the fiber diameters and fiber lengths were obtained based on enlarged views obtained by using SEM. However, these may be obtained by an optical microscope and a laser microscope. Also, the aspect ratios were obtained by calculation using the fiber diameters and fiber lengths. Further, the fiber strength is based on the published values of respective manufacturers.

Figure 2:
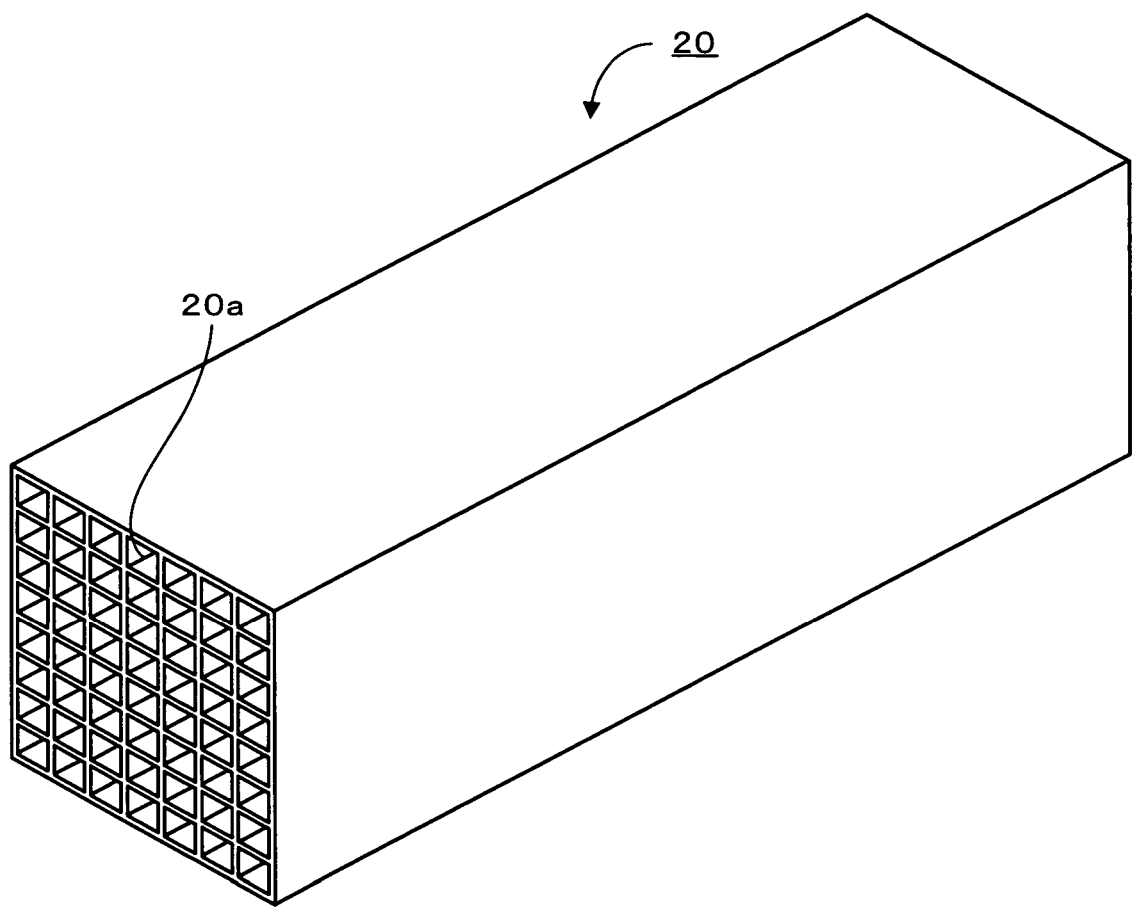
FIG. 2 is a perspective view showing of a honeycomb unit.
Figure 3:
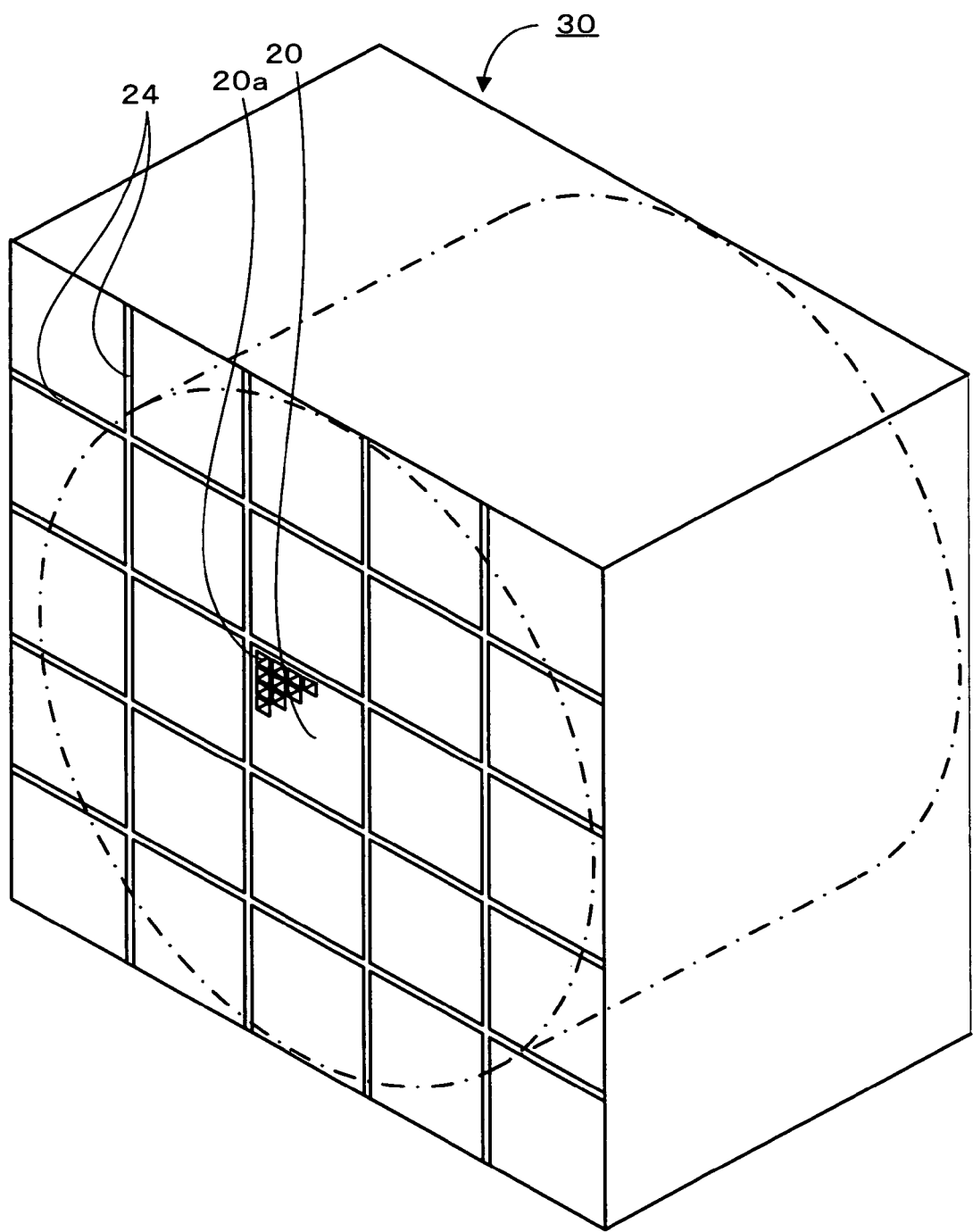
FIG. 3 is a perspective view showing an aggregate of honeycomb units.
Figure 4:
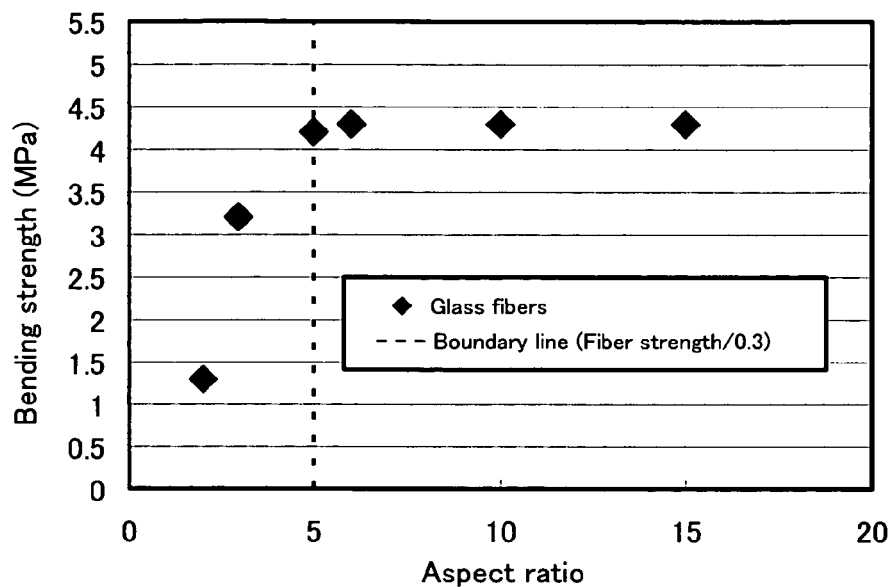
FIG. 4 is a graph showing the relationship between the aspect ratio and the bending strength when glass fibers are used.
Figure 5:
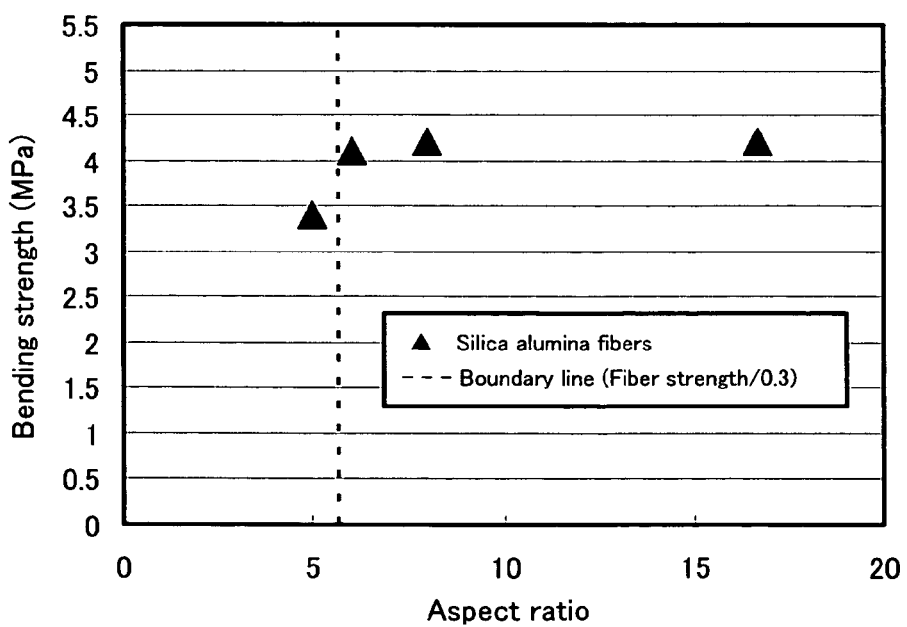
FIG. 5 is a graph showing the relationship between the aspect ratio and the bending strength when silica alumina fibers are used.
Figure 6:
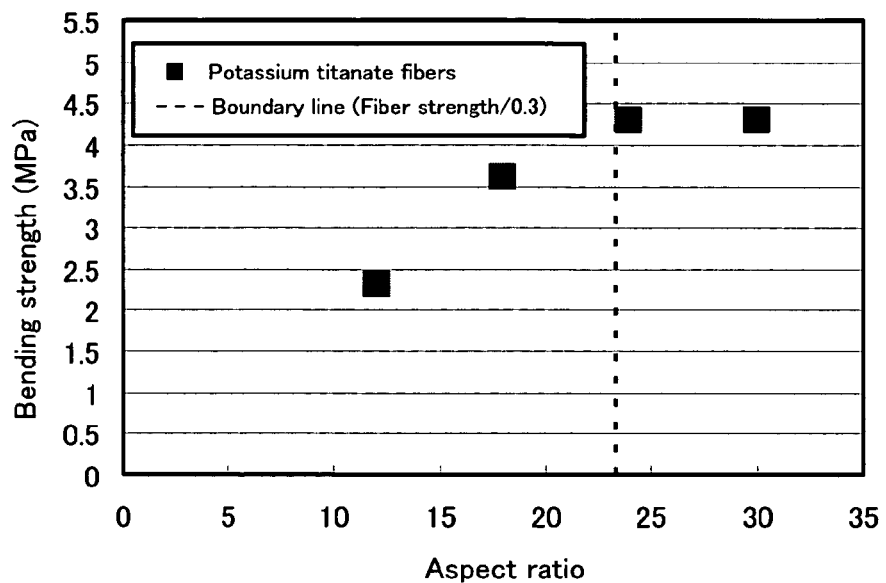
FIG. 6 is a graph showing the relationship between the aspect ratio and the bending strength when potassium titanate fibers are used.
Figure 7:
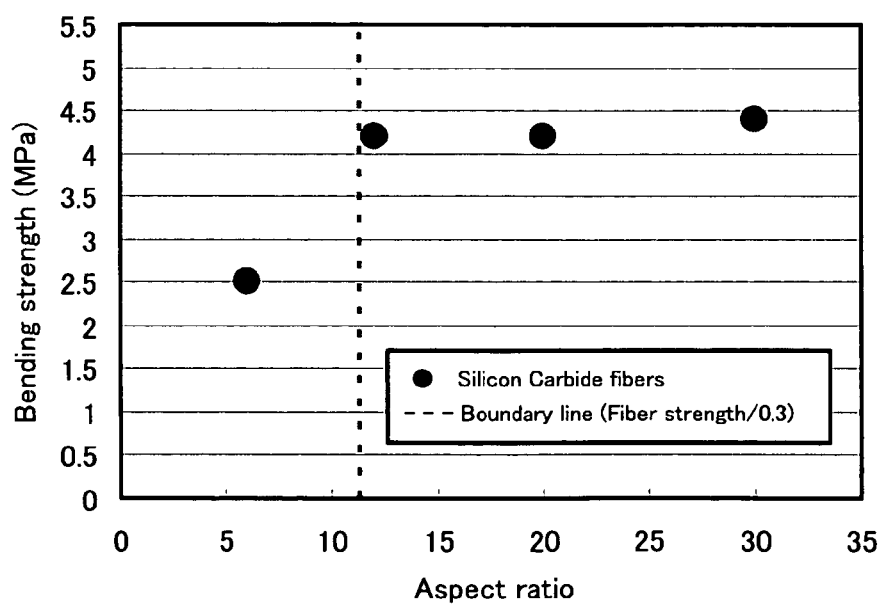
FIG. 7 is a graph showing the relationship between the aspect ratio and the bending strength when silicon carbide fibers are used.
Figure 8:
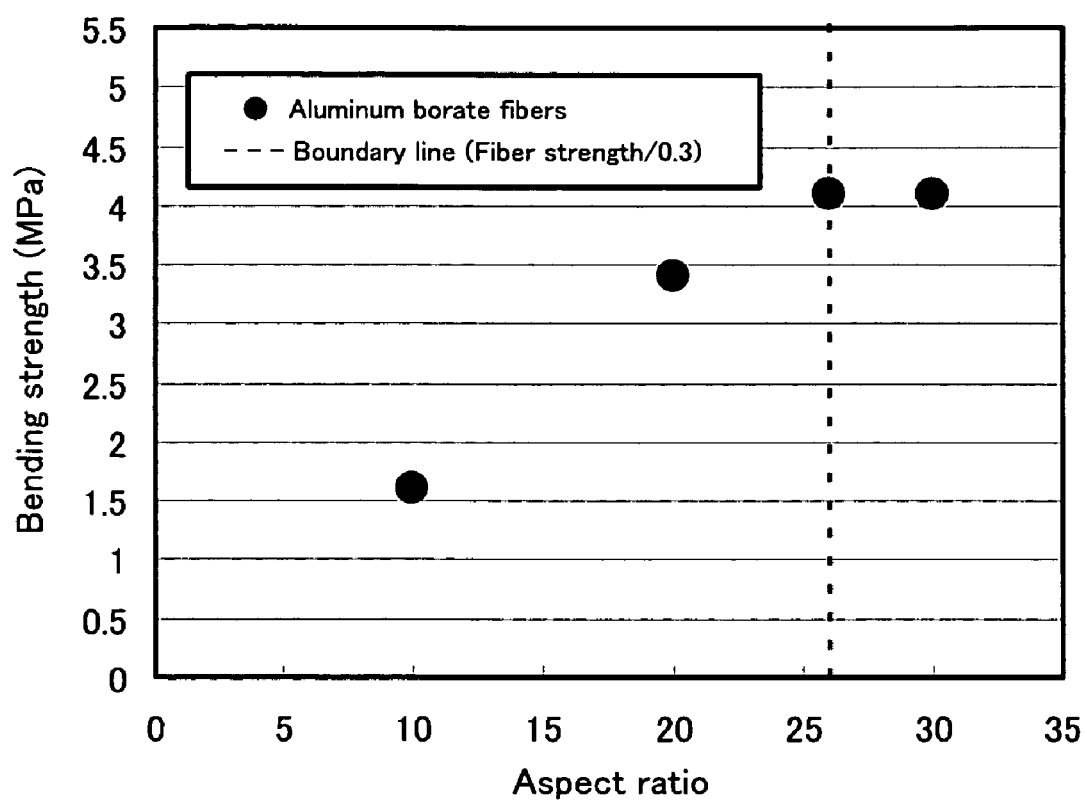
FIG. 8 is a graph showing the relationship between the aspect ratio and the bending strength when aluminum borate fibers are used.

Next, a description is given of an embodiment of the invention. FIG. 1 is a perspective view showing a honeycomb catalyst carrier 10 that is an embodiment of the invention. FIG. 2 is a perspective view showing a basic honeycomb unit 20. FIG. 3 is a perspective view showing a unit aggregate 30.

The honeycomb catalyst carrier 10 which is one example of the honey structure according to the invention is cylindrical as shown in FIG. 1 and includes a plurality of passages 12 penetrating the bottom surface 10a and the upper surface 10b. The honeycomb catalyst carrier 10 is provided with rectangular pillar-shaped basic honeycomb units 20 disposed in a plurality at the middle section thereof, deformed honeycomb units 22 disposed along the circumference so as to surround these basic honeycombs units 20, sealing layers 24 for adhering the outer surfaces of the basic honeycomb units 20 and the deformed honeycomb units 22 to each other, and a cylindrical coating layer 26 formed so as to surround the outer circumferential surface of the deformed honeycomb units 22.

The basic honeycomb unit 20 is a rectangular pillar with a square section as shown in FIG. 2, and has a plurality of through-holes 20a juxtaposed along the axial direction. The through-hole 20a forms a passage 12 of the honeycomb catalyst carrier 10. The basic honeycomb unit 20 may be prepared, for example, as described below. That is, first, γ alumina particles (mean grain size: 2 μm), inorganic fibers and silica sol (solid density: 30% by weight) acting as the inorganic binder are blended at ratios of 40% by weight, 10% by weight and 50% by weight, respectively, methylcellulose acting as the organic binder is added by 6 parts by weight to the obtained mixture of 100 parts by weight, and, further, a plasticizer and a lubricant are slightly added thereto. All of these constituents are mixed and kneaded to prepare material paste. At this time, the inorganic fibers whose aspect ratio, that is, (fiber length/fiber diameter) is equal to or more than a figure obtained by dividing the fiber strength (GPa) by 0.3 are used. Next, the material paste is extrusion-molded by an extrusion-molding machine to obtain a raw molded body. The shape of the raw molded body is made into the same shape as the basic honeycomb unit 20 shown in FIG. 20. Subsequently, the raw molded body is sufficiently dried by using a microwave drying machine and a hot air drying machine, and is kept at 400° C. for two hours, thereby degreasing the same. After that, the molded body is kept at 800° C. for two hours for firing, where the basic honeycomb unit 20 whose shape is a rectangular pillar (34.3 mm×34.3 mm×150 mm), cell density is 62 cells per square centimeter (400 cpsi), and wall thickness is 0.25 mm is obtained.

The deformed honeycomb unit 22 is pillar-shaped, which has an arc at a part of its section and includes a plurality of through-holes 22a juxtaposed along the axial direction. The through-hole 22a forms a passage 12 of the honeycomb catalyst carrier 10. The deformed honeycomb unit 22 is obtained by the following procedures. First, a plurality of the basic honeycomb units 20 are stacked and adhered to each other via the outer surfaces thereof by the sealing layers 24 and are made into a unit aggregate 30 (Refer to FIG. 3) so sized that the aggregate 30 contains the cylindrical shape of the final shape. Next, the unit aggregate 30 is cut to have a cylindrical shape being the final shape. As a result, some of the basic honeycomb units 20, which are juxtaposed along the outer circumference of the cylindrical aggregate 30 are made to have an arc at a part of its section.

The sealing layers 24 may be made of the same material as the material paste used for preparation of the basic honeycomb units 20, and assumes a role of adhering the outer surfaces of the adjacent basic honeycomb units 20 and deformed honeycomb units 22 to each other. The sealing layers 24 are dried and degreased after the basic honeycomb units 20 and deformed honeycomb units 22 are adhered to each other, but are not fired. Also, it is preferable that the thickness of the sealing layers 24 is about 0.5 to about 2 mm. When the thickness is about 0.5 mm or more, the adhesion force is sufficiently obtained, and when the thickness is about 2 mm or less, the ratio of the sealing layers that do not function as a catalyst carrier is not increased, and the catalyst is sufficiently dispersed and carried.

The coating layer 26 may be made of the same material as the material paste used for preparation of the basic honeycomb units 20, and assumes a role of filling up broken passage wall of some of the through-holes 22a in the deformed honeycomb units 22 when the unit aggregate 30 is cut into a cylindrical shape, as well as a role of finishing the outer circumference of the honeycomb catalyst carrier 10 to a smooth cylindrical surface. The coating layer 26 is dried and degreased as in the sealing layers 24, but is not fired. In addition, it is preferable that the thickness of the coating layer 26 is about 0.1 to about 2 mm. When the thickness is about 0.1 mm or more, the coating layer 26 sufficiently protects the outer circumferential surface, and when the thickness is about 2 mm or less, the ratio of the coating layer 26 that does not function as a catalyst carrier is not increased, and the catalyst can be sufficiently dispersed and carried.

Next, a description is given of a use example of a honeycomb catalyst carrier 10 according to the present embodiment. First, the honeycomb catalyst carrier 10 is impregnated in a nitric acid platinum solution and is adjusted so that the platinum weight per unit weight of the honeycomb catalyst carrier 10 becomes 2 grams per liter (2 g/L), and is maintained at 600° C. for one hour, thereby obtaining a honeycomb catalyst. The honeycomb catalyst is accommodated in a casing disposed at the downstream side of the exhaust manifold of a vehicle engine, and assumes a role of converting exhaust gases emitted from the engine.

The honeycomb catalyst carrier 10 according to the embodiment described above in detail is composed of the basic honeycomb units 20 and deformed honeycomb units 22, which are fired bodies including γ alumina particles and inorganic fibers. Since the aspect ratio of the inorganic fibers used herein is equal to or more than a figure obtained by dividing the fiber strength (GPa) by 0.3, it is thought that a honeycomb catalyst carrier having high strength as a honeycomb structure is obtained. The point has been demonstrated and verified as described in the following experiments.

In addition, since such a honeycomb catalyst carrier 10 having high strength can be obtained, it is possible to prevent defects such as cracks and damage from occurring in the manufacturing process of the honeycomb catalyst carrier 10, possible to prevent defects such as cracks and damage from occurring when accommodating the honeycomb catalyst carrier 10 in a casing, and possible to prevent inconveniences such as cracks and damage from occurring due to vibrations and heat when the honeycomb catalyst carrier 10 is accommodated and used.

EXAMPLES

Examples 1 to 22

First, γ alumina particles (mean grain size 2 μm), inorganic fibers (fiber classification, fiber strength, fiber length, fiber diameter, and aspect ratio are as in Table 1), and silica sol (solid density 30% by weight) are blended at ratios of 40% by weight, 10% by weight and 50% by weight, respectively. Methylcellulose acting as the organic binder is added by 6 parts by weight to the obtained mixture of 100 parts by weight, and, further, a plasticizer and a lubricant are slightly added thereto. All of these constituents are mixed and kneaded to obtain a blended composition. Next, the blended composition is extrusion-molded by an extrusion molding machine to obtain a raw molded body. And, the raw molded body is sufficiently dried by using a microwave drying machine and a hot air drying machine and is maintained and degreased at 400° C. for two hours. After that, the molded body is further kept and fired at 800° C. for two hours, where the basic honeycomb unit whose shape is a rectangular pillar (34.3 mm×34.3 mm×150 mm), cell density is 62 cells per square centimeter (400 cpsi), and wall thickness is 0.25 mm is obtained.

[Three-Point Bending Strength]

Measurements of the three-point bending strength were carried out as Examples 1 to 22. The measurements were executed in compliance with the Japanese Industrial Standards JIS-R1601 using a measurement unit (Instron Corporation Model 5582). The entire contents of JIS-R1601 are incorporated by reference herein. In detail, the crosshead speed is set to 1 mm per minute, the span distance L is set to 135 mm, and a break load W is measured with a load applied in the vertical direction with respect to the axis of the basic honeycomb unit. And, the section secondary moment Z is calculated by subtracting the moment of the portion of the through-holes. Then, the three-point bending strength σ is calculated by the following expression. The results are shown in Table 1 and FIG. 4 to FIG. 8.

$$\sigma = WL/4Z$$

TABLE 1

| No. | Fiber type | Fiber strength (GPa) | Fiber length (μm) | Fiber diameter (μm) | Rasp | Fiber strength/ 0.3 | σ (MPa) |
|---|---|---|---|---|---|---|---|
| 1 | Glass | 1.5 | 50 | 10 | 5 | 5 | 4.2 |
| 2 | Glass | 1.5 | 100 | 10 | 10 | 5 | 4.3 |
| 3 | Glass | 1.5 | 150 | 10 | 15 | 5 | 4.3 |
| 4 | Glass | 1.5 | 30 | 5 | 6 | 5 | 4.3 |
| 5 | Glass | 1.5 | 20 | 10 | 2 | 5 | 1.3 |
| 6 | Glass | 1.5 | 30 | 10 | 3 | 5 | 3.2 |
| 7 | Silica alumina | 1.7 | 18 | 3 | 6 | 5.67 | 4.1 |
| 8 | Silica alumina | 1.7 | 50 | 3 | 16.7 | 5.67 | 4.2 |
| 9 | Silica alumina | 1.7 | 40 | 5 | 8 | 5.67 | 4.2 |
| 10 | Silica alumina | 1.7 | 15 | 3 | 5 | 5.67 | 3.4 |
| 11 | Potassium titanate | 7 | 12 | 0.5 | 24 | 23.3 | 4.3 |
| 12 | Potassium titanate | 7 | 15 | 0.5 | 30 | 23.3 | 4.3 |
| 13 | Potassium titanate | 7 | 9 | 0.5 | 18 | 23.3 | 3.6 |
| 14 | Potassium titanate | 7 | 6 | 0.5 | 12 | 23.3 | 2.3 |
| 15 | Silicon carbide | 3.4 | 6 | 0.5 | 12 | 11.3 | 4.2 |
| 16 | Silicon carbide | 3.4 | 15 | 0.5 | 30 | 11.3 | 4.4 |
| 17 | Silicon carbide | 3.4 | 10 | 0.5 | 20 | 11.3 | 4.2 |
| 18 | Silicon carbide | 3.4 | 3 | 0.5 | 6 | 11.3 | 2.5 |
| 19 | Aluminum borate | 7.8 | 13 | 0.5 | 26 | 26 | 4.1 |
| 20 | Aluminum borate | 7.8 | 15 | 0.5 | 30 | 26 | 4.1 |
| 21 | Aluminum borate | 7.8 | 10 | 0.5 | 20 | 26 | 3.4 |
| 22 | Aluminum borate | 7.8 | 5 | 0.5 | 10 | 26 | 1.6 |

* In the table, Rasp means the aspect ratio and σ indicates the three-point bending strength.

As has been made clear in Table 1 and FIG. 4 to FIG. 8, in either fiber classification, the three-point bending strengths of the basic honeycomb unit are stabilized at higher figures when the aspect ratio is equal to or more than the boundary value which is a value obtained by dividing the fiber strength (GPa) by 0.3.

In addition, the invention is not limited to the above-described embodiment and examples, and it is a matter of course that the invention may be subjected to various variations and modifications within the scope not departing from the spirit of the invention.

Priority is claimed on Japanese Patent Application No. 2004-296316, filed on Oct. 8, 2004, and International Application No. PCT/JP20058/014865 filed on Aug. 8, 2005, the entire contents of both of which are incorporated herein by reference.

What is claimed is:

1. A honeycomb structure including ceramic particles and inorganic fibers, wherein the inorganic fibers are ceramic fibers and satisfy an expression of Aspect Ratio≧Fiber Strength (GPa)/0.3.

2. The honeycomb structure according to claim 1, wherein the content ratio of the inorganic fibers is about 5 to about 30% by weight.

3. The honeycomb structure according to claim 1, wherein the aspect ratio of the inorganic fibers is about 5 or more.

4. The honeycomb structure according to any one of claims 1 to 3, wherein the honeycomb structure is used as a component of an exhaust gas conversion apparatus for a vehicle.

5. A method for manufacturing a honeycomb structure, comprising the steps of: blending at least ceramic particles, inorganic fibers and an inorganic binder with each other to obtain a mixed compound;
molding the mixed compound into a honeycombed shape to obtain a honeycomb molded body; and firing the honeycomb molded body so as to obtain a honeycomb structure, wherein the inorganic fibers are ceramic fibers and satisfy an expression of Aspect Ratio≧Fiber Strength (GPa)/0.3.

6. The method for manufacturing a honeycomb structure according to claim 5, wherein the content ratio of the inorganic fibers is about 5 to about 30% by weight.

7. The method for manufacturing a honeycomb structure according to claim 5, wherein the aspect ratio of the inorganic fibers is about 5 or more.

* * * * *

UNITED STATES PATENT AND TRADEMARK OFFICE
CERTIFICATE OF CORRECTION

PATENT NO. : 7,939,157 B2
APPLICATION NO. : 11/494645
DATED : May 10, 2011
INVENTOR(S) : Tsunekawa et al.

It is certified that error appears in the above-identified patent and that said Letters Patent is hereby corrected as shown below:

On the Title Page, Item (73), in the "Assignee", "Ltd," should be --Ltd.,--.

Signed and Sealed this
Fifth Day of July, 2011

David J. Kappos
*Director of the United States Patent and Trademark Office*